(12) United States Patent
Hsieh et al.

(10) Patent No.: US 7,170,760 B2
(45) Date of Patent: Jan. 30, 2007

(54) SWITCHING POWER SUPPLY WITH CLAMPING CIRCUIT

(75) Inventors: Kuan-Hong Hsieh, Shenzhen (CN); Xiao-Guang He, Shenzhen (CN)

(73) Assignee: Hong Fu Jin Precision Industry (Shen Zhen) Co., Ltd., Shenzhen ( * ) Notice: Subject to any disclaimer, the term of this patent is extended or adjusted under 35 U.S.C. 154(b) by 0 days.

(21) Appl. No.: 11/163,434

(22) Filed: Oct. 19, 2005

(65) Prior Publication Data

US 2006/0139978 A1 Jun. 29, 2006

(30) Foreign Application Priority Data

Dec. 24, 2004 (TW) ............... 93140442 A

(51) Int. Cl.
*H02M 3/335* (2006.01)
(52) U.S. Cl. ............... 363/16; 363/52; 363/56.01; 363/67; 307/35
(58) Field of Classification Search ............ 363/15–17, 363/52, 53, 65, 67, 84, 125, 126, 55, 56.01; 307/11, 17, 31, 33, 35, 39, 130
See application file for complete search history.

(56) References Cited

U.S. PATENT DOCUMENTS

| 4,024,451 A | * | 5/1977 | Nishino et al. ............... 363/25 |
| 4,389,702 A | | 6/1983 | Clemente et al. |
| 4,631,654 A | * | 12/1986 | Houee et al. ............ 363/21.07 |
| 6,922,345 B1 | | 7/2005 | Nishida et al. |

* cited by examiner

*Primary Examiner*—Gary L Laxton
(74) *Attorney, Agent, or Firm*—Winston Hsu

(57) ABSTRACT

A switching power supply with clamping circuit includes a clamping circuit between a slave output terminal and a master output terminal thereof, to prevent voltage drift at the slave output terminal. The clamping circuit includes a switching circuit connected between the slave output terminal and the master output terminal, and a voltage stabilizing circuit connected between the slave output terminal and the switching circuit. When the output voltage at the slave output terminal steps up to a certain level, the voltage stabilizing circuit functions and enables the switching circuit, and therefore prevents the output voltage from climbing higher than the load requires.

7 Claims, 3 Drawing Sheets

SWITCHING POWER SUPPLY WITH CLAMPING CIRCUIT

FIELD OF THE INVENTION

The present invention relates to switching power supplies, and particularly to a switching power supply that can control voltage drift at output terminals thereof.

DESCRIPTION OF RELATED ART

As shown in FIG. 3, a traditional switching power supply generally includes a input rectification and filter circuit 20, a pulse-width control circuit 30, a transformer 40, a plurality of output rectification and filter circuits that coupled with the transformer and a plurality of output terminals coupled with the output rectification and filter circuits. In FIG. 1, only two output rectification and filter circuits 610, 620 and two output terminal 612, 622 are shown for illustration consideration. A feedback loop is positioned between the output terminals 622 and the pulse-width control circuit 30. Further, a resistor 80 is coupled to the output terminal 612. In such a traditional switching power supply, if the resistor 80 is withdrawn, when the output terminal 612 is coupled to no or little loads while the output terminal 622 is coupled to normal or heavily loads, output voltage at the output terminal 612 will floating upward, and heavily effects the output quality of the switching power supply.

In the known art described above, the resistor 80 is adopted to compensate the loss of normal loads which ought to be coupled to the output terminal 612. However, the resistor 80 is a big power consumer, it works all time even when the output terminal 612 is coupled to a normal load.

Therefore, there is a need for a novel switching power supply which not only holds the output of the switching power supply from climbing upward, but also consumes less power than a comparable switching power supply in the known art.

SUMMARY OF INVENTION

To solve the above-mentioned and other problems, a switching power supply with a clamping circuit is provided. The switching power supply includes: a pulse-width control circuit; a transformer having a plurality of secondary windings; a slave branch circuit connected to one of the secondary windings, and including a slave output terminal; a master branch circuit connected to another one of the secondary windings, and including a master output terminal; and a clamping circuit positioned between the slave output terminal and the master output terminal, and including a voltage stabilizing circuit and a switching circuit. The switching circuit is connected between the slave output terminal and the master output terminal. The voltage stabilizing circuit is connected between the slave output terminal and the switching circuit, and can enable and disable the switching circuit.

The switching circuit is a controllable three-terminal switching circuit, and includes a control terminal connected with the voltage stabilizing circuit, an input connected with the slave output terminal, and an output connected with the master output terminal. The slave branch circuit has a normal output range, while the clamping circuit has a working voltage higher than a maximum normal output voltage in the normal output voltage range of the slave branch circuit. The clamping circuit is enabled when an output voltage at the output terminal reaches the working voltage of the clamping circuit. When functioning, the voltage stabilizing circuit enables the switching circuit, thereby maintaining the output voltage at a proper level equal to the threshold whereat the clamping circuit is enabled, thus preventing the output voltage from climbing higher.

The switching power supply detailed above prevents voltage drift at the slave output terminal. In addition, each of the clamping circuits functions only when the output voltage of the slave branch circuit connected therewith reaches its working voltage, which is higher than the maximum normal output voltage in the normal output voltage range of the slave branch circuit. The clamping circuit will cease functioning when the slave branch circuit has a normal output voltage, thereby avoiding redundant power consumption.

Other advantages and novel features will become more apparent from the following detailed description when taken in conjunction with the accompanying drawings, in which:

DETAILED DESCRIPTION

Figure 1:
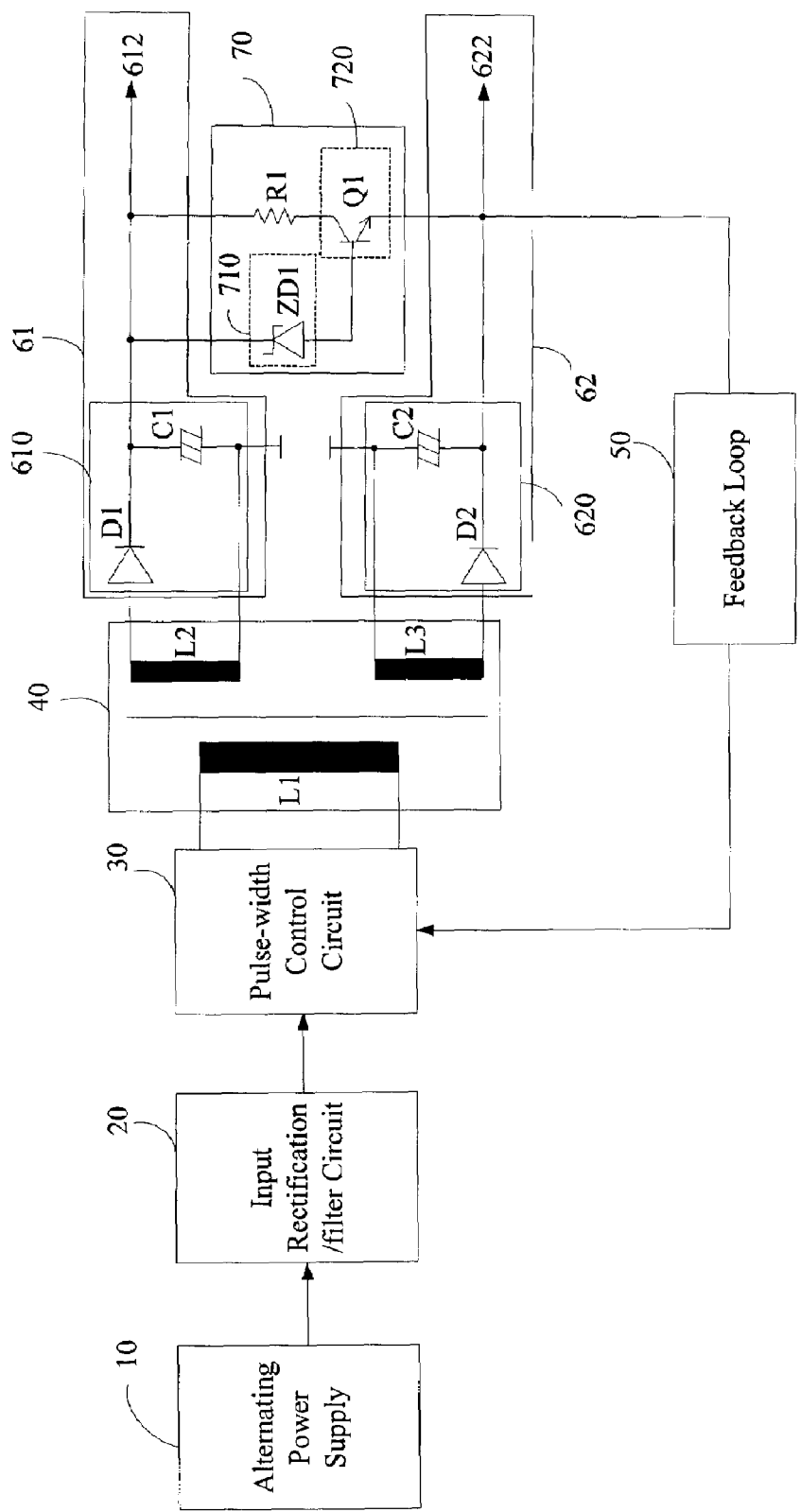
FIG. 1 is a circuit block diagram of a switching power supply in accordance with a preferred embodiment of the present invention, wherein a clamping circuit included to control voltage drift at a slave output terminal of a slave branch circuit is detailed.

FIG. 1 is a circuit block diagram of a switching power supply in accordance with a preferred embodiment of the present invention. The switching power supply converts AC to DC from an alternating power supply 10 to power loads (not shown) connected therewith, and possesses a plurality of sequentially series-connected circuits, including an input rectification and filter circuit 20, a pulse-width control circuit 30, a transformer 40, and a series of transformer following circuits which are connected to secondary windings of the transformer 40. In addition, the switching power supply further possesses a feedback loop 50 positioned between the pulse-width control circuit 30 and the transformer following circuits. The transformer 40 includes a primary winding L1 and at least two secondary windings, each of the secondary windings driving a corresponding transformer following circuit. For brevity, only two secondary windings L2 and L3 of the transformer 40 and their corresponding transformer following circuits 61 and 62 are shown in FIG. 1 and detailed in the following description. The secondary windings L2 and L3, and the transformer following circuits 61 and 62 are respectively referred to as a slave winding L2, a master winding L3, a slave branch circuit 61, and a master branch circuit 62.

The slave branch circuit 61 and the master branch circuit 62 have some parts in common, such as an output rectification and filter circuit and an output terminal that directly connects to loads. To differentiate the output rectification and filter circuits from each other, they will hereinafter be designated as a slave rectification and filter circuit 610, a slave output terminal 612, a master rectification and filter circuit 620, and a master output terminal 622. However, the slave branch circuit 61 and the master branch circuit 62 may each include other electrical components. These other electrical components have relatively little importance for the purposes of the present embodiment, and therefore detailed descriptions thereof are omitted herefrom.

As shown in FIG. 1, a diode D1 and a capacitor C1 are connected in series across the slave winding L2 and constitute the slave output rectification and filter circuit 610. The diode D1 has its anode connected with one end if the slave winding L2, and has its cathode connected to the capacitor C1. The capacitor C1 in turn is connected to the other end of the slave winding L2 and to ground. Extending from a node between the diode D1 and the capacitor C1, the slave output terminal 612 is formed to transfer power to the loads. The master output rectification and filter circuit 620 shown in FIG. 1 is similar to the slave output rectification and filter circuit 610. The master output terminal 622 extends from a node between a diode D2 and a capacitor C2 of the master output rectification and filter circuit 620.

In FIG. 1, the diodes D1 and D2 respectively serve as rectifiers for the power transferred by the transformer 40, and the capacitors C1 and C2 respectively act as filters for the power output from the diodes D1 and D2. However, as known to those skilled in the art, there are many kinds of rectifiers and filters that can be utilized in place of the diodes D1, D2 and the capacitors C1, C2. Accordingly, the diodes D1, D2 and the capacitors C1, C2 illustrated and described herein are not to be construed as limitations of the present invention.

The switching power supply has a clamping circuit 70 connected between the slave output terminal 612 and the master output terminal 622, to prevent an output voltage at the slave output terminal 612 from climbing upward once reaching a certain level. The clamping circuit 70 in the preferred embodiment preferably includes a voltage stabilizing circuit 710 and a switching circuit 720. The voltage stabilizing circuit 710 is connected between the slave output terminal 612 and the switching circuit 720. In FIG. 1, the voltage stabilizing circuit 710 includes a zener diode ZD1 whose cathode and anode are connected to the slave output terminal 612 and the switching circuit 720 respectively. In alternative embodiments of the present invention, the zener diode ZD1 can be replaced by other stabilizing circuits, such as an IC (integrated Circuit) stabilizing circuit.

The switching circuit 720 is in a controllable three-terminal form, and includes a control terminal connected with the voltage stabilizing circuit 710, an input connected to the slave output terminal 612, and an output connected to the master output terminal 622. The output of the switching circuit 720 is also connected to an input terminal of the feedback loop 50. Under the control of the voltage stabilizing circuit 710, the switching circuit 720 switches on and provides feedback power to the pulse-width control circuit 30 through the feedback loop 50. In FIG. 1, the switching circuit 720 includes a transistor Q1. A base of the transistor Q1 is connected to the anode of the zener diode ZD1, a collector of the transistor Q1 is connected with the slave output terminal 612 through a resistor R1, and an emitter of the transistor Q1 is connected to the master output terminal 622 and the feedback loop 50.

According to the preferred embodiment, the clamping circuit 70 functions when the loads connected to the slave output terminal 612 and the master output terminal 622 are out of balance; that is, the clamping circuit 70 works only when the slave branch circuit 61 has a small load or no load while the master branch circuit 62 has a normal or heavy load. The clamping circuit 70 has a working voltage, which is mostly determined by the voltage stabilizing circuit 710 thereof, and which is a little higher than a maximum normal output voltage in a normal output voltage range at the slave output terminal 612. In the preferred embodiment of the present invention, the slave output terminal 612 reaches its normal output voltage only when the slave branch circuit 61 has a normal load in addition to the master branch circuit 62 having a normal load.

Figure 2:
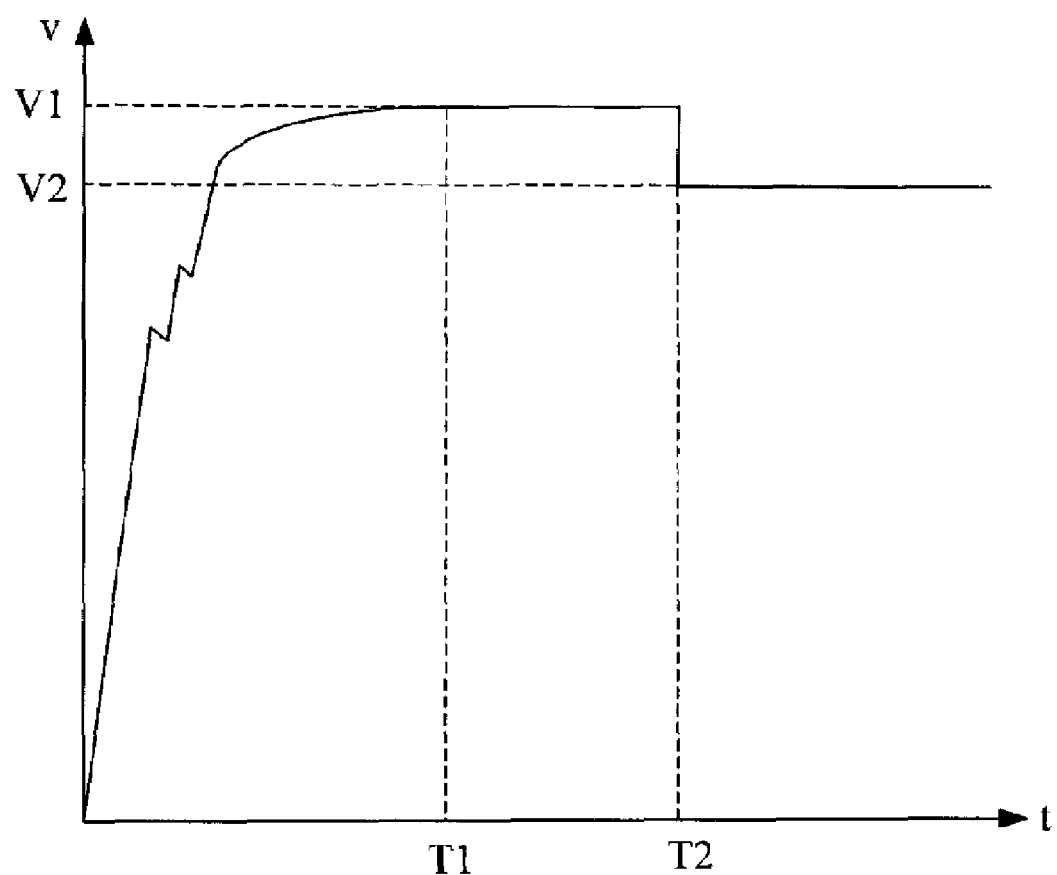
FIG. 2 is a graph showing variation of an output voltage of the slave branch circuit of FIG. 1 versus time.
Figure 3:
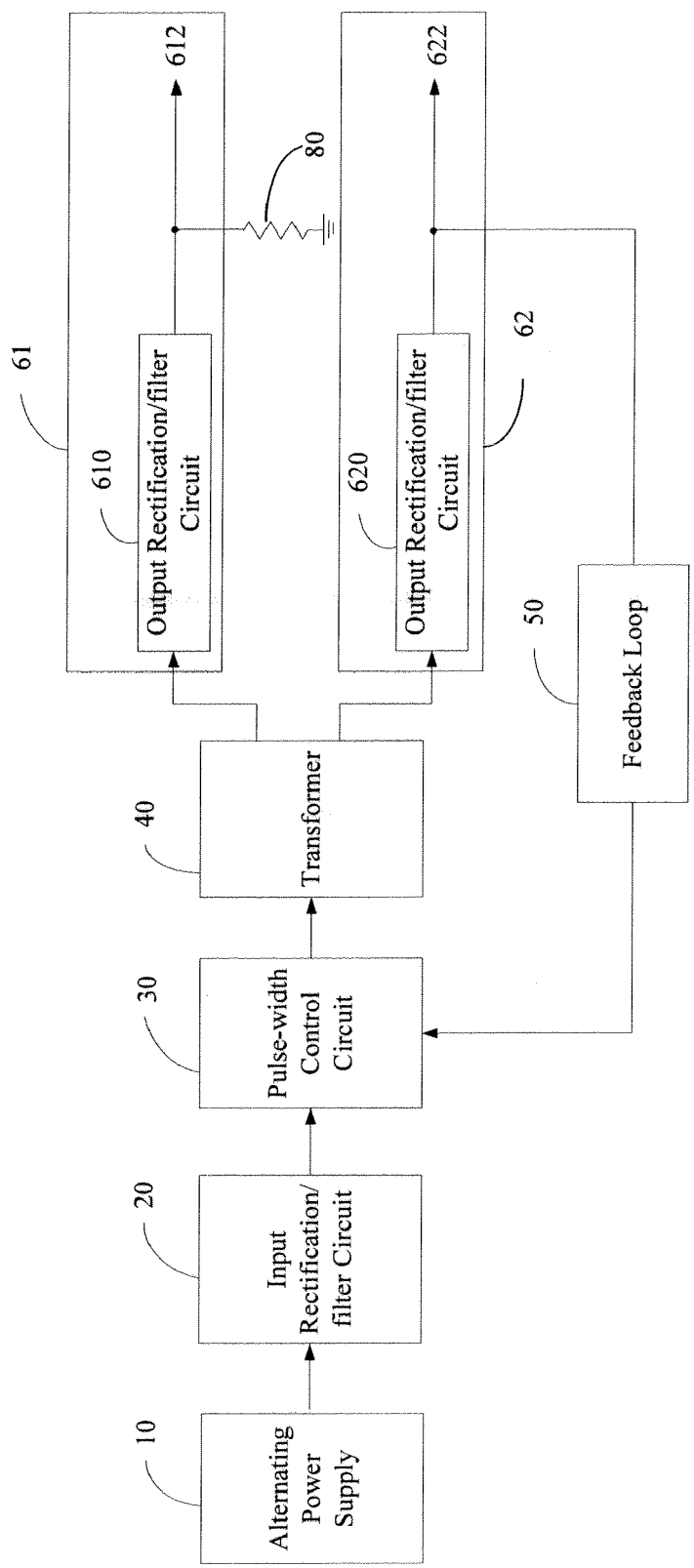
FIG. 3 is a circuit block diagram of a switching power supply of the prior art.

FIG. 2 is a graph showing variation of the output voltage of the slave branch circuit 61 versus time. In FIG. 2, the horizontal axis shows time (t), and the vertical axis shows the output voltage (v) of the slave branch circuit 61 (that is, at the slave output terminal 612); T1~T2 denotes a duration in which the clamping circuit 70 works; and V1 and V2 respectively represent the working voltage of the clamping circuit 70, and the maximum normal output voltage in the normal output voltage range of the slave output circuit 710.

Prior to T1, the slave branch circuit 61 has a small load or no load while the master branch circuit 62 has a normal or heavy load. The output voltage at the slave output terminal 612 increases over time until reaching V1 at T1. At T1, the clamping circuit 70 begins to function; that is, the voltage stabilizing circuit 710 enables the switching circuit 720. The clamping circuit 70 maintains the output voltage at the slave output terminal 612 at V1 until T2. At T2, the slave branch circuit 61 has begun to carry an approximately balanced load as compared with the master branch circuit 62, and the output voltage at the slave output terminal 612 drops to the normal output voltage V2. As V2 is lower than V1, the clamping circuit 70 ceases to function, thereby avoiding redundant consumption of power.

The above description is based on the configuration whereby the transformer 40 adopts only two secondary windings L2 and L3 which each drive a respectively transformer following circuit, i.e., the slave branch circuit 61 and the master branch circuit 62. However, the present invention is also applicable to configurations that have more than two transformer following circuits. In such configurations, a corresponding number of clamping circuits are added to the switching power supply of the above-described embodiment and positioned between the slave output terminals and the main output terminals, to prevent voltage drift at the slave output terminals.

It is to be further understood that even though numerous characteristics and advantages of the present embodiments have been set forth in the foregoing description, together with details of the structures and functions of the embodiments, the disclosure is illustrative only, and changes may be made in detail, especially in matters of type and arrangement of components within the principles of the invention to the full extent indicated by general meaning of the terms in which the appended claims are expressed.

What is claimed is:

1. A switching power supply, comprising:
   a pulse-width control circuit;
   a transformer having a plurality of secondary windings;
   a slave branch circuit connected to one of the secondary windings and comprising a slave output terminal, the slave branch circuit having a normal output voltage range;
   a master branch circuit connected to another one of the secondary windings and comprising a master output terminal; and
   a clamping circuit positioned between the slave output terminal and the master output terminal, and comprising a voltage stabilizing circuit having a working voltage higher than a maximum normal output voltage in the normal output voltage range and a switching circuit, the switching circuit being connected between the slave output terminal and the master output terminal, the voltage stabilizing circuit being connected between the slave output terminal and the switching circuit, and being capable of enabling the switching circuit when an output voltage at the slave output terminal reaches the working voltage thereof.

2. The switching power supply according to claim 1, wherein the switching circuit is a controllable three-terminal switching circuit, and has a control terminal connected with the voltage stabilizing circuit, an input connected with the slave output terminal, and an output connected with the master output terminal.

3. The switching power supply according to claim 2, wherein the voltage stabilizing circuit conducts and controls the switching circuit to switch on when the output voltage at the slave output terminal reaches the working voltage of the stabilizing circuit.

4. The switching power supply according to claim 1, further comprising an input rectification and filter circuit positioned before the pulse-width control circuit and used to rectify and filter AC power from an alternating power supply.

5. The switching power supply according to claim 1, further comprising a feedback loop positioned between the master output terminal and the pulse-width control circuit.

6. The switching power supply according to claim 1, wherein the slave branch circuit further comprises a slave output rectification and filter circuit connected between said one of the secondary windings and the slave output terminal.

7. The switching power supply according to claim 1, wherein the master branch circuit further comprises a master output rectification and filter circuit connected between said another one of the secondary windings and the master output terminal.

* * * * *

UNITED STATES PATENT AND TRADEMARK OFFICE
CERTIFICATE OF CORRECTION

PATENT NO. : 7,170,760 B2  Page 1 of 1
APPLICATION NO. : 11/163434
DATED : January 30, 2007
INVENTOR(S) : Kuan-Hong Hsieh et al.

It is certified that error appears in the above-identified patent and that said Letters Patent is hereby corrected as shown below:

On the title page item (73), correct the assignee from

"HONG FU JIN PRECISION INDUSTRY (Shen Zhen) CO., LTD., Shenzhen"

to

"HONG FU JIN PRECISION INDUSTRY (Shen Zhen) CO., LTD., Shenzhen
HON HAI PRECISION INDUSTRY CO., LTD., Taipei Hsien"

Signed and Sealed this

Twenty-sixth Day of January, 2010

David J. Kappos
*Director of the United States Patent and Trademark Office*